United States Patent [19]

Tsuji et al.

[11] Patent Number: 6,137,537
[45] Date of Patent: Oct. 24, 2000

[54] TELEVISION RECEIVER FOR RECEIVING MULTI-STANDARDS

[75] Inventors: Toshiaki Tsuji, Kobe; Naoki Kurita, Takatsuki; Minoru Miyata, Suita; Toshihiro Miyoshi, Takatsuki, all of Japan

[73] Assignee: Matsushita Electric Industrial Co., Ltd., Osaka, Japan

[21] Appl. No.: 09/162,398

[22] Filed: Sep. 28, 1998

Related U.S. Application Data

[62] Division of application No. 08/652,689, May 30, 1996.

[30] Foreign Application Priority Data

Jun. 2, 1995 [JP] Japan .................................. 7-136468
Jun. 5, 1995 [JP] Japan .................................. 7-137665

[51] Int. Cl.$^7$ .......................... H04N 5/44; H04N 5/445; H04N 5/46; H04N 5/45
[52] U.S. Cl. ......................... 348/554; 348/542; 348/553; 348/555; 348/556
[58] Field of Search ............................. 348/554, 555, 348/542, 556, 558, 426, 557, 526, 553, 563, 564, 565, 566, 567, 568, 571, 584, 705, 706; H04N 5/44, 5/445, 5/45, 5/46, 5/268

[56] References Cited

U.S. PATENT DOCUMENTS 4,546,377 10/1985 Kasagi et al. .
4,962,428 10/1990 Tong et al. .
4,996,718 2/1991 Shiomi ...................................... 455/326
5,353,065 10/1994 Katsumata ............................... 348/389
5,374,962 12/1994 Klink .
5,461,427 10/1995 Duffield et al .
5,475,436 12/1995 Watanabe ................................ 348/455
5,557,337 9/1996 Scarpa .
5,751,375 5/1998 Ninomiya ............................... 348/555
5,796,442 8/1998 Gove ....................................... 348/558

FOREIGN PATENT DOCUMENTS

620681 10/1994 European Pat. Off. .
643354 3/1995 European Pat. Off. .
60-022264 2/1985 Japan .
02154583 6/1990 Japan .
02302184 12/1990 Japan .
06296286 10/1994 Japan .

Primary Examiner—Mark R. Powell
Assistant Examiner—Wesner Sajous
Attorney, Agent, or Firm—Ratner & Prestia

[57] ABSTRACT

A multi-standard television receiver in accordance with the present invention includes a plurality of video signal processing blocks having tristate functions at their output terminals, at least one memory block used in common for a plurality of video signal processing blocks and a video signal processing selection means for selecting one of the video signal processing blocks and independently controlling the output terminals of the video signal processing blocks using elements having a tristate function and can reduce power consumption by working only a selected video signal processing block and stopping the other video signal processing blocks. Further, using elements having a tristate function, possibility of element breakdown at selection and control of the elements can be removed.

10 Claims, 7 Drawing Sheets

TELEVISION RECEIVER FOR RECEIVING MULTI-STANDARDS

This application is a division of U.S. patent application Ser. No. 08/652,689, filed May 30, 1996.

BACKGROUND OF THE INVENTION

The present invention relates to a television receiver which decodes video signals for a plurality of broadcast standards, such as MUSE (multiple sub-Nyquist sampling encoding) standard to transmit a HighVision signal and EDTV-2 (second generation extended definition television) standard.

In recent years, HighVision broadcast has been put in practical use and broadcast employing a MUSE standard was commenced. In NTSC standard broadcast, broadcast employing an EDTV-2 standard is going to be commenced and television receivers which can receive video signals of a plurality of broadcast standards are increasingly needed.

A decoder for a MUSE standard is introduced in a technical report "MUSE HighVision transmission standard" by Ninomiya edited by Electronic Information Communication Institute and a decoder for an EDTV-2 standard is introduced in "Part 2, transmission and reception circuits—high resolution component is separately transmitted", Nikkei Electronics 1994, January 31 vol. 600, pp. 142–149.

Figure 8:
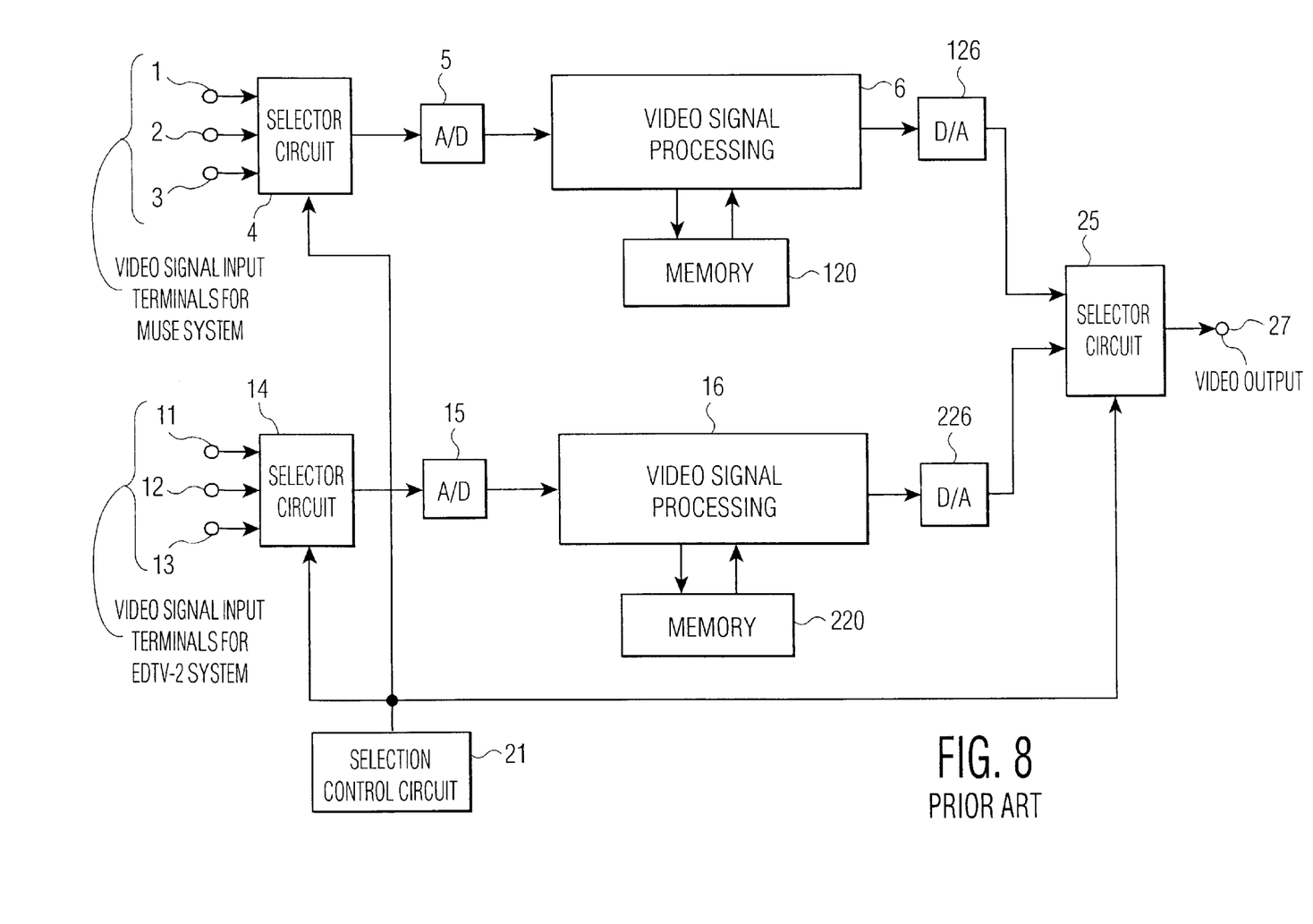
FIG. 8 is an example of a block diagram of a decoder part of a television receiver for receiving multi-standards in accordance with the prior art.
Figure 9:
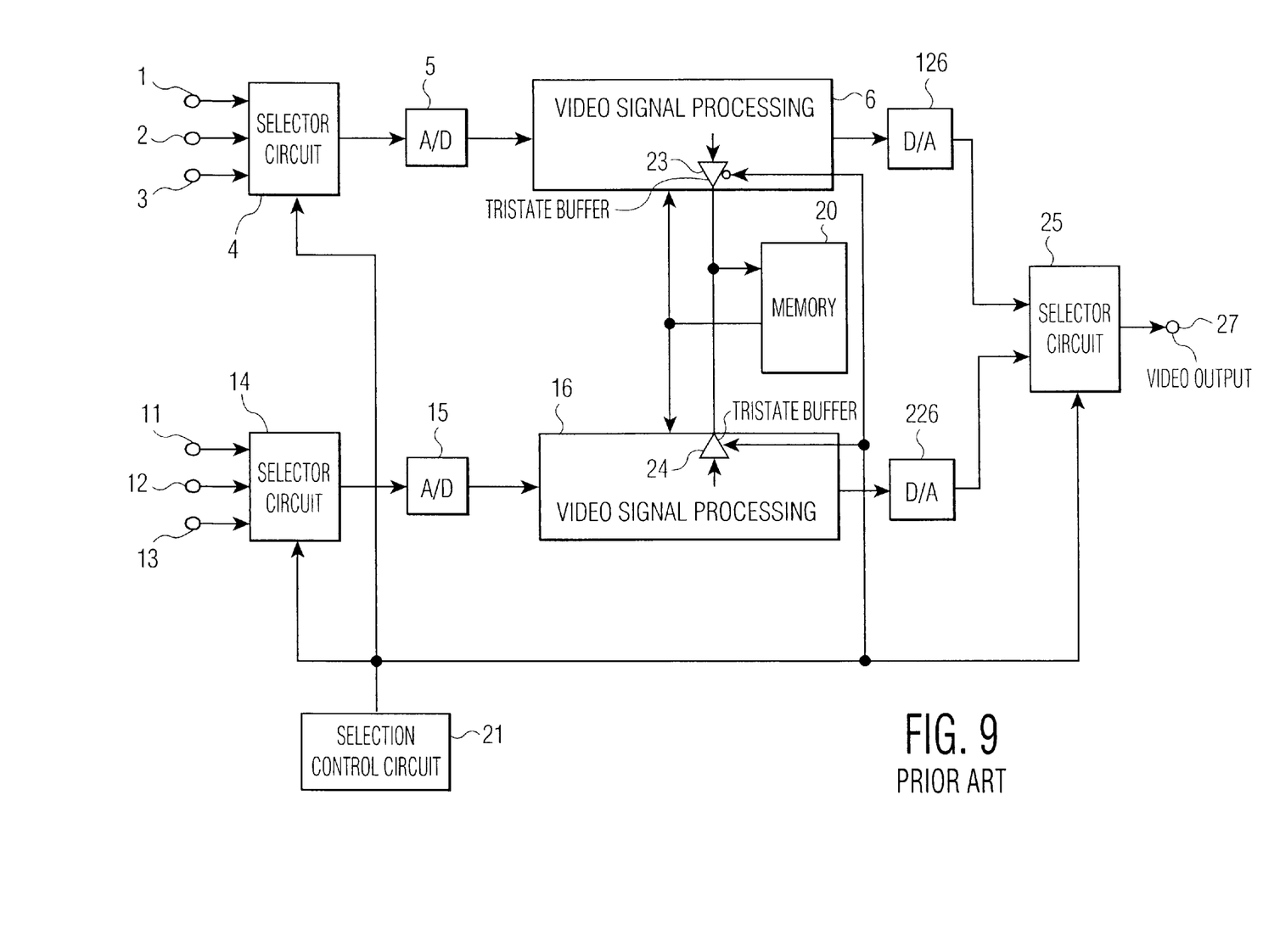
FIG. 9 is another example of a block diagram of a decoder part of a television receiver for receiving multi-standards in accordance with the prior art.

Examples of a block diagram generally thought as a decoder part of a television receiver which can receive a plurality of kinds of broadcast standards are shown in FIGS. 8 and 9. In exemplary embodiments of the present invention, a case having two video signal processing blocks as a plurality of video signal processing means and three channels for each MUSE standard and NTSC standard as the number of video signal sources is described for simplicity of explanation.

FIG. 8 is an example of a block diagram of a decoder part of a television receiver for receiving multi-standards to be generally thought in accordance with the prior art.

In FIG. 8, the terminals 1, 2 and 3 are video signal input terminals for a MUSE standard signal. The block 4 is a selector circuit for selecting a video signal out of a plurality of input terminals 1, 2 and 3. The block 5 is an A/D (from analog to digital) converter for converting an analog video signal oitputted from selector circuit 4 into a digital video signal. The block 6 is a first video signal processing block for decoding an output signal of A/D converter 5. The block 120 is a first memory block for storing a video signal during several frame periods and is connected to first video signal processing block 6. The block 126 is a D/A (from digital to analog) converter for converting a digital video signal outputted from first video signal processing block 6 into an analog video signal.

The terminals 11, 12 and 13 are video signal input terminals for an EDTV-2 standard signal. The block 14 is a selector circuit for selecting a video signal out of a plurality of input terminals 11, 12 and 13. The block 15 is an A/D converter for converting an analog output signal of selector circuit 14 into a digital signal. The block 16 is a second video signal processing block for decoding an output signal of A/D converter 15. The block 220 is a second memory block for storing a video signal during several frame periods and is connected to second video signal processing block 16. The block 226 is a D/A converter for converting an output signal of second video signal processing block 16 into an analog signal.

The block 25 is a selector circuit for selecting an output signal of either D/A converter 126 or 226. The terminal 27 is an output terminal of selector circuit 25. The block 21 is a selection control circuit for controlling selection of selection circuits 4, 14 and 25.

The function of a decoding part of television receiver for receiving multi-standards configured like the above in accordance with the prior art is explained below.

In the case in which a video signal of MUSE standard is displayed, a selection control circuit 21 controls selector circuit 25 so as to select an output of D/A converter 126 and selects an input signal by controlling a selector circuit 4. For example, when a satellite broadcast (BS, hereafter) is received, an input terminal 1 connected to a detector output terminal of a BS tuner is selected and when a laser disk picture is watched, an input terminal 2 connected to an external input terminal is selected.

The inputted video signal is decoded at a first video signal processing block 6 after being converted into a digital signal at an A/D converter 5. The first video signal processing block 6 is composed of a moving picture processing block for executing interpolation processing from an input signal during continuous several horizontal scanning periods, a still-picture processing block for executing interpolation processing from a signal during two frame periods stored in first memory block 120, a movement detecting block for detecting a moving part from the signal during the two frame periods and a block for mixing an output signal of the moving picture processing block and an output signal of the still picture processing block and outputs a signal in which its mixing ratio is varied according to a signal expressing a degree of movement supplied from the movement detecting block. Thus, a video signal of MUSE system is decoded.

In the case in which a video signal of EDTV-2 standard is displayed, selection control circuit 21 controls selector circuit 25 so as to select an output of D/A converter 226 and selects an input signal by controlling selector circuit 14. For example, when an EDTV-2 broadcast is received, an input terminal 11 connected to a detector output terminal of a tuner is selected and when a laser disk picture or a video cassette picture is watched, input terminal 12 connected to an external input terminal is selected.

The inputted video signal is decoded at second video signal processing block 16 after being converted into a digital signal at A/D converter 15. At second video signal processing block 16, a composite video signal is separated into a luminance signal and a chrominance signal (that is, Y/C separation) by three dimensional processing and an enhanced signal multiplexed on the luminance signal is decoded and reproduced to increase vertical and horizontal resolution are increased. In this case, a high frequency component to be superimposed is controlled by a movement signal detected from a frame difference signal. Thus, a video signal of EDTV-2 standard is decoded. In the example shown in FIG. 8, memory blocks 120 and 220 are used for a MUSE standard signal and an EDTV-2 standard signal, respectively and the memory block is not used in common.

FIG. 9 is another example of a block diagram of a decoder part of a television receiver for receiving multi-standards to be generally thought in accordance with the prior art.

In FIG. 9, the terminals 1, 2 and 3 are video signal input terminals for MUSE standard. The block 4 is a selector circuit for selecting a video signal out of a plurality of input terminals 1, 2 and 3. The block 5 is an A/D converter for converting an analog output signal of selector circuit 4 into a digital signal. The block 6 is a first video signal processing block for decoding an output signal of A/D converter 5. The block 126 is a D/A converter for converting an output signal of first video signal processing block 6 into an analog signal.

The terminals 11, 12 and 13 are video signal input terminals for EDTV-2 standard. The block 14 is a selector circuit for selecting a video signal out of a plurality of input terminals 11, 12 and 13. The block 15 is an A/D converter for converting an analog output signal of selector circuit 14 into a digital signal. The block 16 is a second video signal processing block for decoding an output signal of A/D converter 15. The block 226 is a D/A converter for converting an output signal of second video signal processing block 16 into an analog signal.

The block 25 is a selector circuit for selecting an output signal of either D/A converter 126 or 226. The block 20 is a memory block for storing a video signal during several frame periods and is connected to first video signal processing block 6. The block 23 is a tristate buffer through which an output signal of first video signal processing block 6 is supplied to memory block 20. The block 24 is a tristate buffer through which an output signal of second video signal processing block 16 is supplied to memory block 20. The block 21 is a selection control circuit for controlling selection of selection circuits 4, 14 and 25 and tristate buffers 23 and 24.

The function of a decoder part of a television receiver for receiving multi-standards configured like the above in accordance with the prior art is explained below.

The basic function is similar to that of the previous example shown in FIG. 8. The difference from that shown in FIG. 8 is that a memory block 20 used at video signal decoding of each standards is used in common and this point is an improved point from the previous example.

In the case in which a video signal of MUSE standard is decoded, tristate buffer 23 is controlled to be in a normal output state and tristate buffer 24 is controlled so as to be in a high impedance state. This control is made by an output signal of selection control circuit 21.

In the case in which a video signal of EDTV-2 standard is decoded, tristate buffer 23 is controlled to be in a high impedance state and tristate buffer 24 is controlled so as to be in a normal output state.

In the above-described configuration shown in FIG. 9, however, when a video signal processing block 6 or 16 is selected by a selection control circuit 21, because a control signal wire from selection control circuit 21 to video signal processing blocks 6 and 16 is common, the video signal processing blocks 6 and 16 are transiently in a simultaneous output state during some period, a signal of the output terminal of either video signal processing block flows into the output terminal of the other video signal processing block due to such as drive ability difference between the output terminals of the video signal processing blocks and drive elements at the above-mentioned output terminals could be broken.

Further, because power is supplied to also the video signal processing block which is not used now, wasteful power is dissipated.

In the case in which it is tried to decrease power dissipation by stopping a drive clock signal of the video signal processing block which is not used now, there is a problem that it takes long time to output a video signal because the action starts from a sync detection at selecting a video signal processing block.

In the case in which the memory block used in common is controlled by only a selection control signal of the input or output signal, there is a problem that a normal selection is impossible when a plurality of different standards exist in the same channel.

SUMMARY OF THE INVENTION

The first object of the present invention is that a selection drive of a plurality of video signal processing blocks is made to be optimum and not to break driving elements in a television receiver having a plurality of video signal processing blocks using one memory block in common. The second object of the present invention is to present a television receiver in which wasteful power dissipation is decreased at switching of a plurality of video signal processing blocks and it takes only short time to output a video signal even when a drive clock signal to the video signal processing block which is not used for decreasing power dissipation is stopped.

To achieve the above-mentioned objects, a television receiver for receiving multi-standards in accordance with a first exemplary embodiment of the present invention comprises:

a plurality of video signal processing blocks having a tristate function at their output terminals, at least a memory block connecting output signal lines from the video signal processing blocks to an input terminal of the memory block in common, a video signal processing selection circuit for independently controlling selection of the output terminals of the video signal processing blocks connected to the memory blocks in common to select either one of the video signal processing blocks.

A second exemplary embodiment of the present invention, it is configured so that power supplies of the circuits in each video signal processing block which is in an unused state excluding a sync separator circuit can be stopped according to a control signal of the video signal processing selection circuit.

A third exemplary embodiment of the present invention, it comprises a drive clock signal generator circuit which can stop a drive clock signal of the video signal processing blocks excluding a sync separator circuit according to a control signal of the video signal processing selection circuit.

A television receiver in accordance with a fourth exemplary embodiment of the present invention comprises:

a plurality of video signal processing blocks;

at least a memory block, wherein a plurality of sync detection circuits for detecting if a sync signal is included in the video signal, and input terminals of the memory blocks and output terminals of the video signal processing blocks corresponding to the input terminal of the memory block are connected in common and a tristate function is provided at the output terminal of each video signal processing block;

a first selection control circuit for selecting an input video signal; and a second selection control circuit which is connected to the output terminals of the sync detection circuits and the first selection control circuit and controls the tristate function of the video signal processing block.

In a fifth exemplary embodiment of the present invention, the second selection control circuit includes:

an expansion circuit connected to the output terminal of either sync detection circuit;

a judgment circuit connected to the output terminals of the expansion circuit and the first selection control circuit and for controlling the tristate function of either video signal processing block; and an reversing circuit connected to the output terminal of the judgment circuit and for controlling the tristate function of the other video signal processing block.

In a sixth exemplary embodiment of the present invention, the second selection control circuit is connected to the output terminals of the sync detection circuits and the first selection control circuit and provides with a judgment circuit for independently controlling the tristate functions of the video signal processing blocks.

According to the above configuration, a television receiver for receiving multi-standards having a memory block in common without breaking drive elements at the output terminals of the video signal processing blocks to the memory blocks and without dissipating wasteful power can be realized. It is possible to shorten the time for outputting a video signal when a video signal processing block is selected, attempting to reduce the power consumption at the video signal processing blocks which are in an unused state.

According to the above configuration, it is possible to correctly select a signal to supply to a memory block and the memory block can be used in common by controlling the output signal of the video signal processing blocks connected to the memory input terminal in common, using an input/output selection control signal and a signal to detect a sync signal.

DETAILED DESCRIPTION OF THE INVENTION

The entire disclosure of U.S. patent application Ser. No. 08/652,689, filed May 30, 1996 is expressly incorporated by reference herein.

(First exemplary embodiment)

Figure 1:
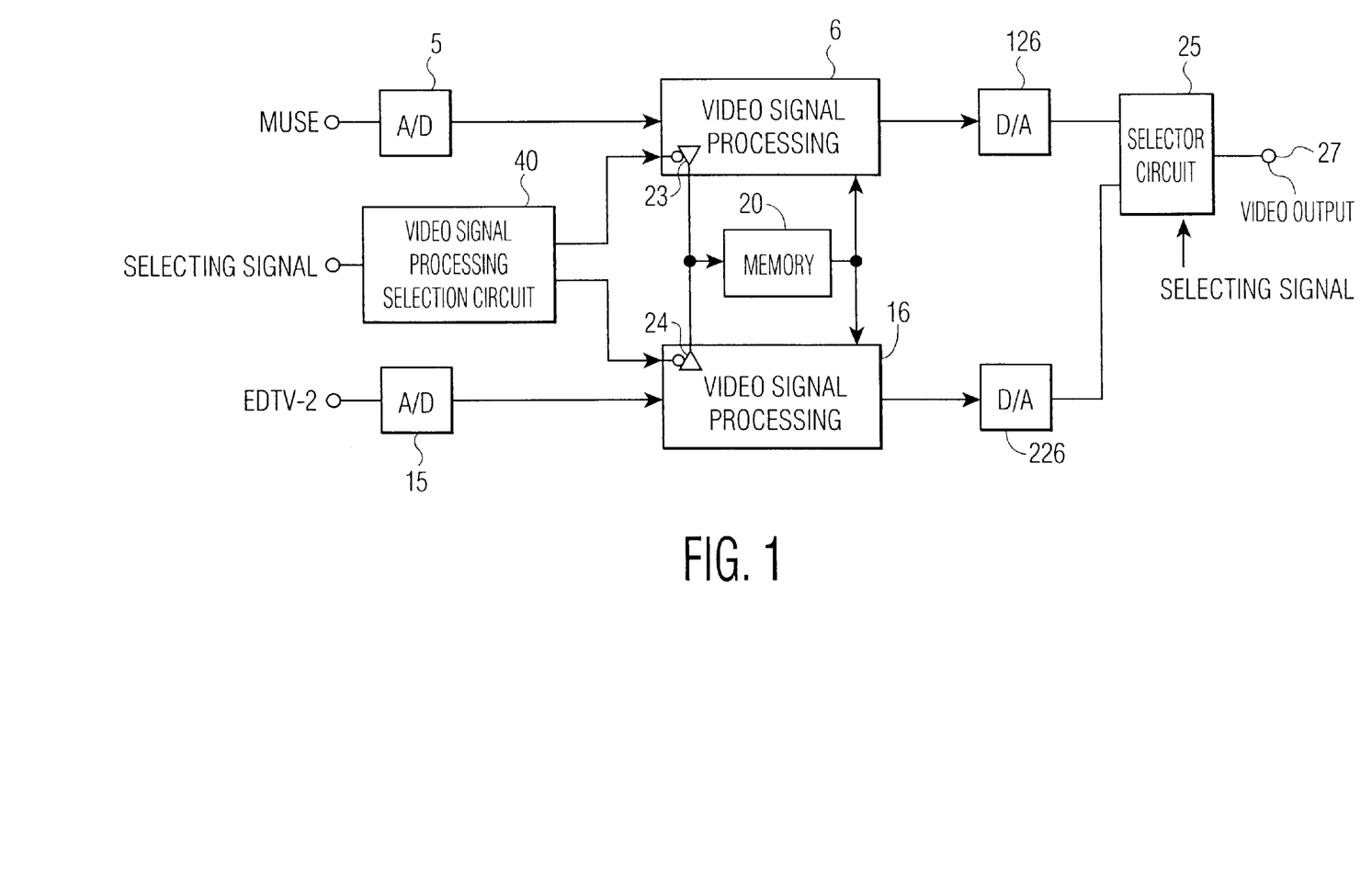
FIG. 1 is a block diagram of a decoder part of a television receiver for receiving multi-standards in accordance with a first exemplary embodiment of the present invention.

FIG. 1 is a block diagram of a decoder part of a television receiver for receiving multi-standards in accordance with a first exemplary embodiment of the present invention.

A/D converters 5 and 15 convert analog video signals of MUSE and EDTV-2 standards, respectively to digital video signals. Video signal processing blocks 6 and 16 process the digital video signals of MUSE and EDTV-2 standards, respectively. A memory block 20 is used as a memory for processing a video signal of either MUSE or EDTV-2 standard processed at video signal processing blocks 6 and 16, respectively and selected by a signal from a video signal processing selection circuit 40. Video signal processing selection circuit 40 makes the output terminal of video signal processing blocks excluding the video signal processing block selected by a selection signal to the memory block a high impedance state. D/A converters 126 and 226 convert the digital video signals processed at video signal processing blocks 6 and 16 into analog video signals. A selector circuit 25 selects and outputs an output signal of either video signal processing blocks 6 or 16 by selection signals.

The function of a television receiver for receiving multi-standards having a common memory is explained below, referring to FIG. 1.

When the video signal processing blocks are switched by video signal processing selection circuit 40 on the basis of a selection signal from such as a channel selection remote controller, the output terminals of both video signal processing blocks to memory block 20 are once made high impedance state by two independent control signal lines from video signal processing selection circuit 40 and then only the output terminal of the video signal processing block to be selected to memory block 20 is released from a high impedance state and controlled to be in a normal output state.

Thus, according to the first exemplary embodiment of the present invention, because there is no period during which a plurality of video signal processing blocks are simultaneously in an output state, there is no danger that a signal at one of the output terminals flows into the other output terminal due to a drive ability difference between the output terminals and a drive element at the other output terminal is broken.

(Second exemplary embodiment)

Figure 2:
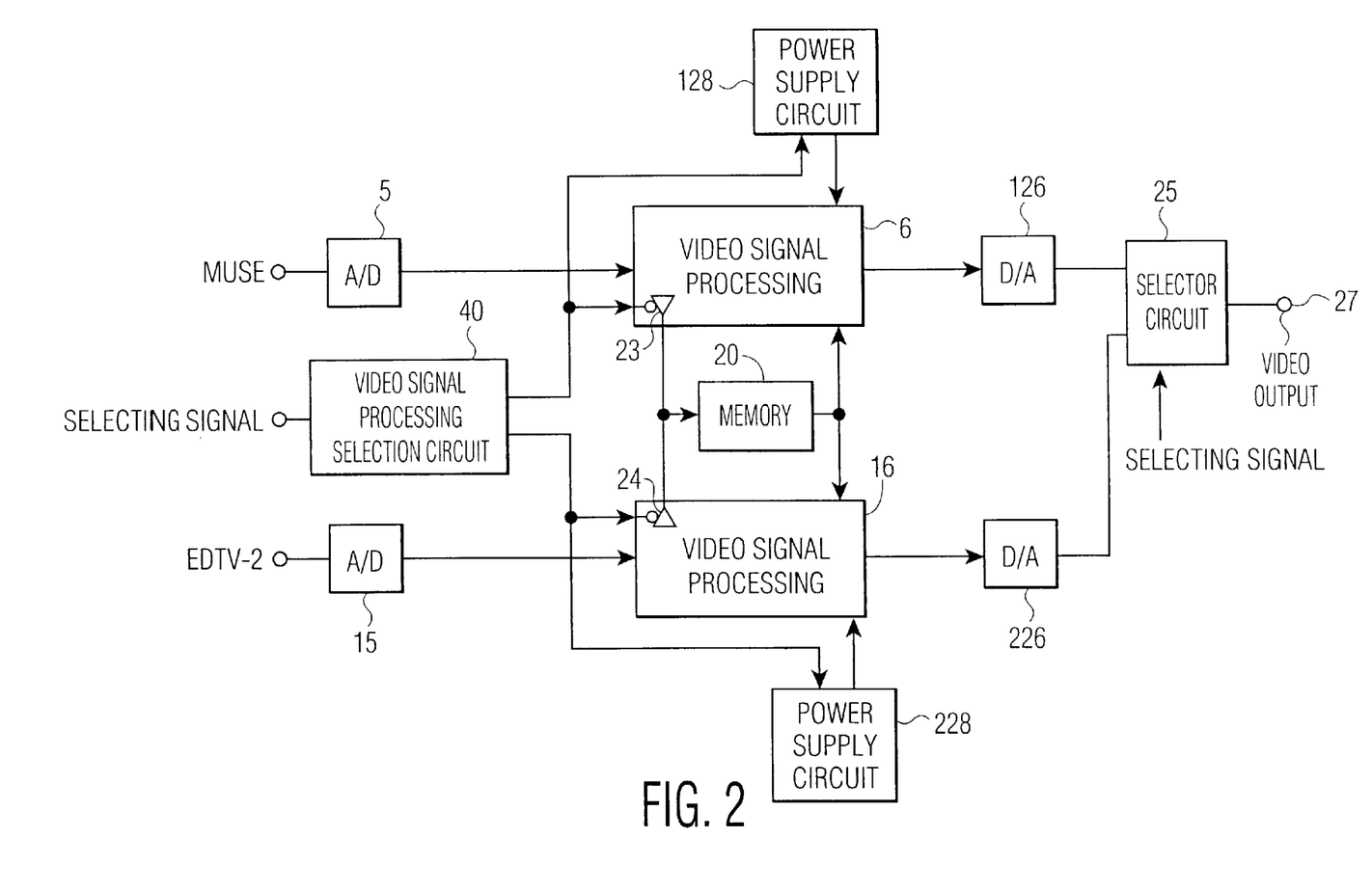
FIG. 2 is a block diagram of a decoder part of a television receiver for receiving multi-standards in accordance with a second exemplary embodiment of the present invention.

FIG. 2 is a block diagram of a decoder part of a television receiver for receiving multi-standards in accordance with a second exemplary embodiment of the present invention.

A/D converters 5 and 15, video signal processing blocks 6 and 16, a memory block 20, a video signal processing selection circuit 40, D/A converters 126 and 226 and a selector circuit 25 are similar to those in the first exemplary embodiment of the present invention and their descriptions are omitted. The blocks 128 and 228 are power supplies, each has an independent power supply switch and supplies power to its corresponding video signal processing block.

The function of a television receiver for receiving multi-standards configured like the above is explained below, referring to FIG. 2.

Video signal processing selection circuit 40 is connected to power supply switches of power supply circuits 128 and 228 by control signal lines and controls not to supply power to the video signal processing block which is in an unused state. [28]

Thus, according to the second exemplary embodiment of the present invention, in addition to the effect mentioned in the first exemplary embodiment, it is possible to decrease power consumption although the time necessary for starting outputting a video signal at selecting a video signal processing block is less shortened.

(Third exemplary embodiment)

Figure 3:
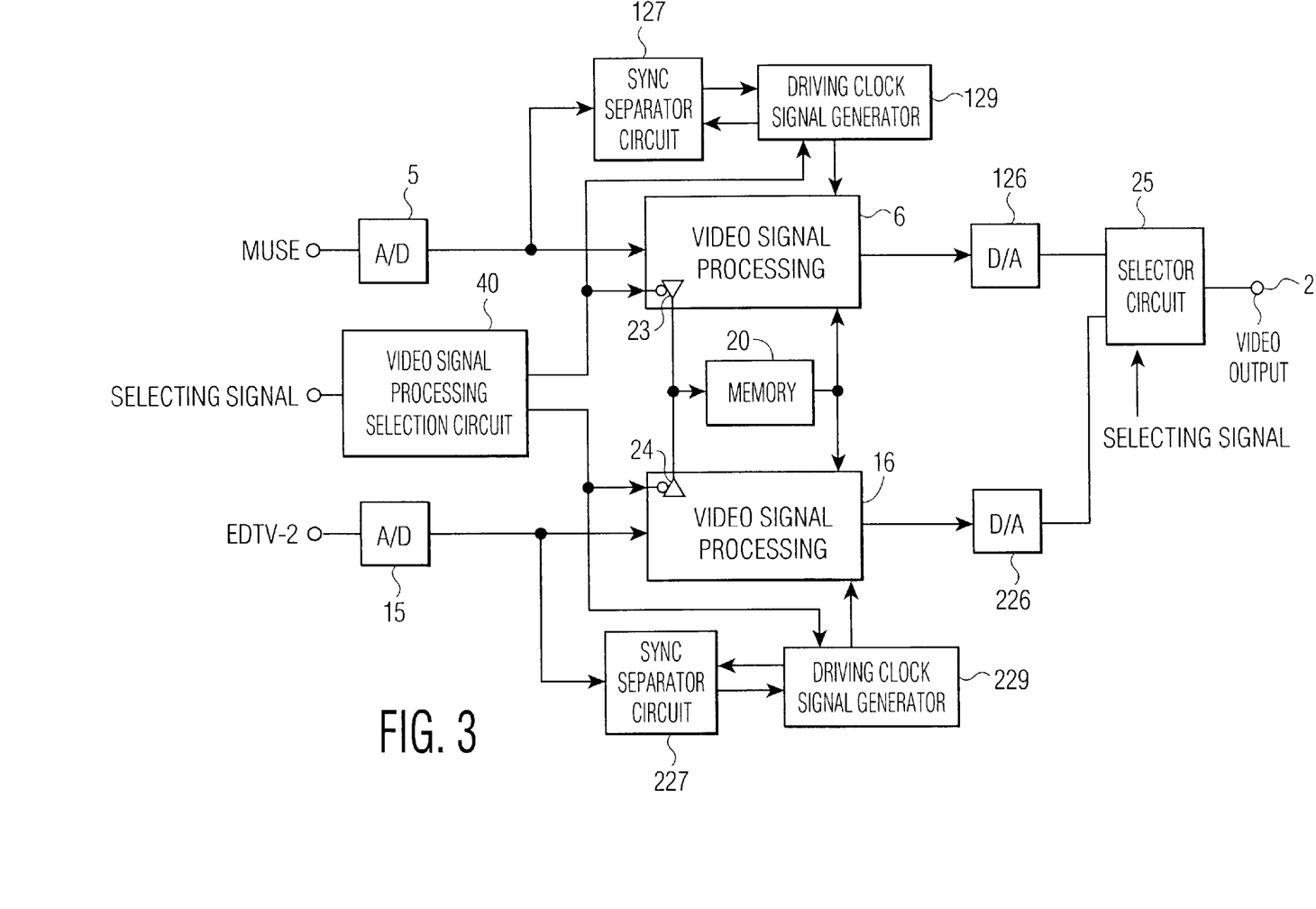
FIG. 3 is a block diagram of a decoder part of a television receiver for receiving multi-standards in accordance with a third exemplary embodiment of the present invention.

FIG. 3 is a block diagram of a decoder part of a television receiver for receiving multi-standards in accordance with a third exemplary embodiment of the present invention.

A/D converters 5 and 15, video signal processing blocks 6 and 16, a memory block 20, a video signal processing selection circuit 40, D/A converters 126 and 226 and a selector circuit 25 are similar to those in the first exemplary embodiment of the present invention and their descriptions are omitted. The blocks 127 and 227 are sync separator circuits and separate sync signals from a MUSE signal and a EDTV-2 signal, respectively. The blocks 129 and 229 are driving clock signal generators for supplying driving clock signals necessary for a MUSE signal and a EDTV-2 signal, respectively.

The function of a television receiver for receiving multi-standards configured like the above is explained below, referring to FIG. 3.

Video signal processing selection circuit 40 is connected to driving clock signal generators 129 and 229 by control signal lines. Driving clock signal generators 129 and 229 always supply driving clock signals to sync separator circuits 127 and 227. As for supplying driving clock signals to video signal processing blocks 6 and 16, however, a driving clock signal is supplied to only a video signal processing block to be used and is not supplied to the other video signal processing block by a control signal from video signal processing selection circuit 40.

Thus, according to the third exemplary embodiment of the present invention, in addition to the effect mentioned in the first exemplary embodiment, it is possible to decrease power consumption by stopping a driving clock signal to a video signal processing block which is in an unused state and it is possible to select a video signal processing block faster by making always supplying driving clock signals to the sync separator circuits.

(Fourth exemplary embodiment)

Figure 4:
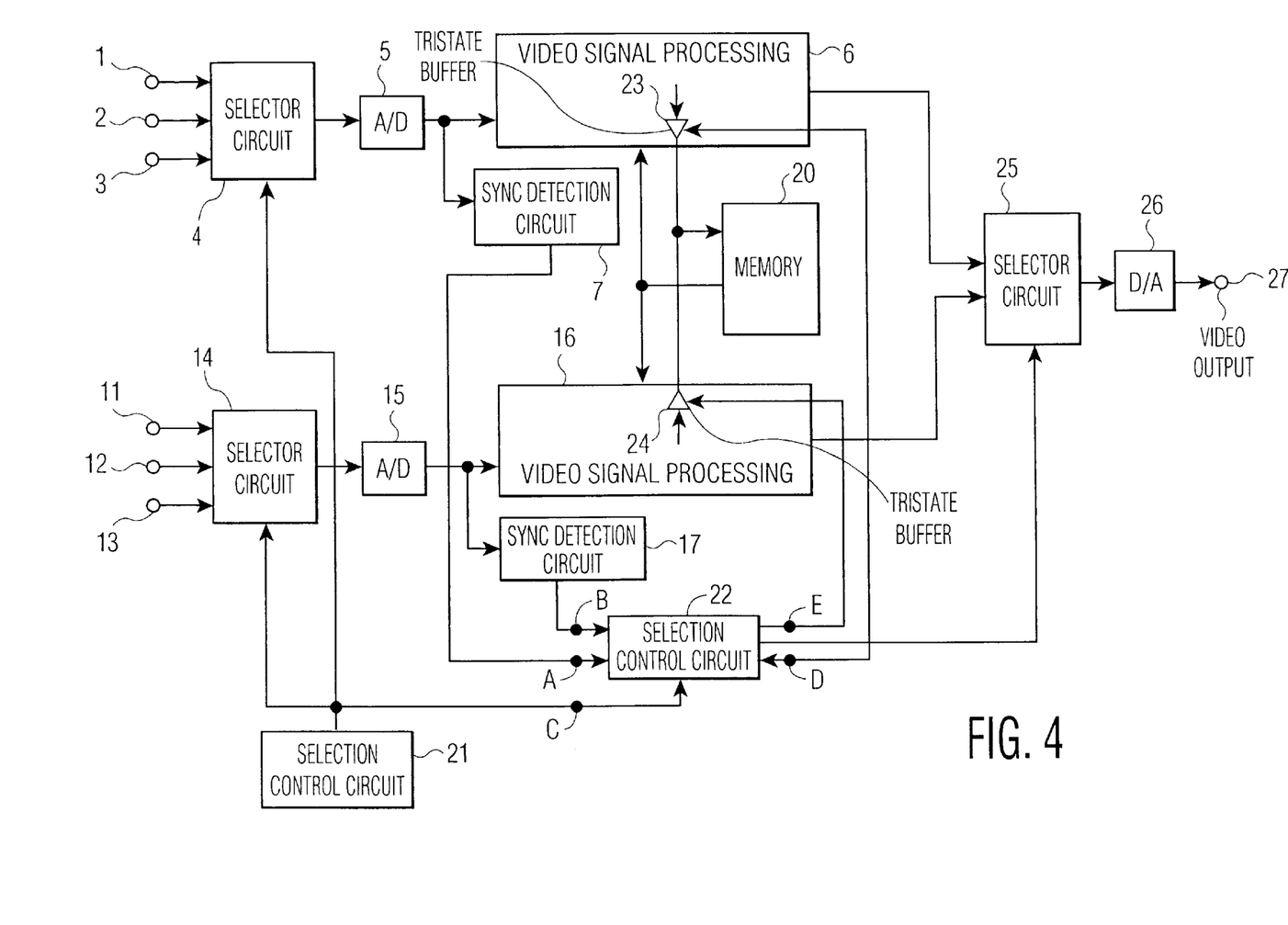
FIG. 4 is a block diagram of a decoder part of a television receiver for receiving multi-standards in accordance with a fourth exemplary embodiment of the present invention.

FIG. 4 is a block diagram of a decoder part of a television receiver for receiving multi-standards in accordance with a fourth exemplary embodiment of the present invention.

The terminals 1, 2 and 3 are video signal input terminals for MUSE standard. The block 4 is a selector circuit for selecting a video signal out of a plurality of input terminals 1, 2 and 3. The block 5 is an A/D converter for converting an analog output signal of selector circuit 4 into a digital signal. The block 6 is a first video signal processing block for decoding an output signal of A/D converter 5.

The terminals 11, 12 and 13 are video signal input terminals for EDTV-2 standard. The block 14 is a selector circuit for selecting a video signal out of a plurality of input terminals 11, 12 and 13. The block 15 is an A/D converter for converting an analog output signal of selector circuit 14 into a digital signal. The block 16 is a second video signal processing block for decoding an output signal of A/D converter 15.

The block 20 is a memory block for storing a video signal during several frame periods and is connected to video signal processing blocks 6 and 16. The blocks 23 and 24 are tristate buffers inserted at the output terminals of video signal processing blocks 6 and 16 to memory block 20, respectively. The block 25 is a selector circuit for selecting an output signal of either video signal processing block 6 or 16. The block 26 is a D/A converter for converting a digital output signal of selector circuit 25 into an analog signal.

The above descriptions are the same as those described for the prior art. Differences from the prior art are as follows. The block 7 is a first sync detection circuit for detecting if a sync signal of MUSE standard is included in the output signal of A/D converter 5. The block 17 is a second sync detection circuit for detecting if a sync signal of NTSC standard is included in the output signal of A/D converter 15. The block 21 is a first selection control circuit for controlling first selector circuit 4, second selector circuit 14 and second selection control circuit 22. The block 22 is a second selection control circuit connected to the output terminals of first sync detection circuit 7, second sync detection circuit 17 and first selection control circuit 21 and controls tristate buffers 23 and 24 and output selector circuit 25.

The function of a television receiver for receiving multi-standards configured like the above is explained below, referring to FIG. 4.

First sync detection circuit 7 detects a frame pulse forming a MUSE standard and outputs a signal "sync yes" if a sync signal is detected and outputs a signal "sync no" if a sync signal is not detected. Similarly, second sync detection circuit 17 detects a vertical sync signal of an NTSC standard and outputs.

In the case in which a BS broadcast is watched, first selection control circuit 21 controls selector circuits 4 and 14 so as to select input terminals. 1 and 11 connected to the output terminals of the BS tuner.

When a sync signal of MUSE standard is detected at first sync detection circuit 7, tristate buffer 23 is made a normal output state by an output signal of second selection control circuit 22 and tristate buffer 24 is made a high impedance state and selector circuit 25 is controlled so as to select an output signal of first video signal processing block 6. Thus, a video signal of MUSE standard is decoded using memory block 20 and first video signal processing block 6.

When a sync signal of MUSE standard is not detected at first sync detection circuit 7, tristate buffer 23 is made a high impedance state by the output of first sync detection circuit 7 and tristate buffer 24 is made a normal output state and selector circuit 25 is controlled so as to select an output signal of second video signal processing block 16. Thus, a video signal of NTSC standard is processed using memory block 20 together with second video signal processing block 16. As examples of video signal processing, there are decoding of an EDTV-2 signal, two pictures on the same screen, stopping a picture and so on.

In the case in which a laser disk signal of NTSC standard is displayed, selector 14 selects input terminal 12 connected to an external input terminal by the output signal of first selection control circuit 21. When selector circuit 4 selects input terminal 1 connected to the output terminal of the BS tuner and a sync signal of MUSE standard is detected at first sync detection circuit 7, second selection control circuit 22 controls tristate buffers 23 and 24 only using the output of first selection control circuit 21 and without using the output of first sync detection circuit 7. Although the case in which first sync detection circuit 7 is used was described above, it is also possible to control using second sync detection circuit 17.

Thus, according to the fourth exemplary embodiment of the present invention, it is possible to control selection correctly with a memory block in common by providing a plurality of video signal sync detection circuits, first selection control circuit for selecting input/output video signals and second selection control circuit connected to the output terminals of the sync detection circuits and the first selector circuit and controls tristate functions of the video signal processing blocks, even if a plurality of standards such as MUSE standard and EDTV-2 standard are broadcast on the same channel.

(Fifth exemplary embodiment)

Figure 5:
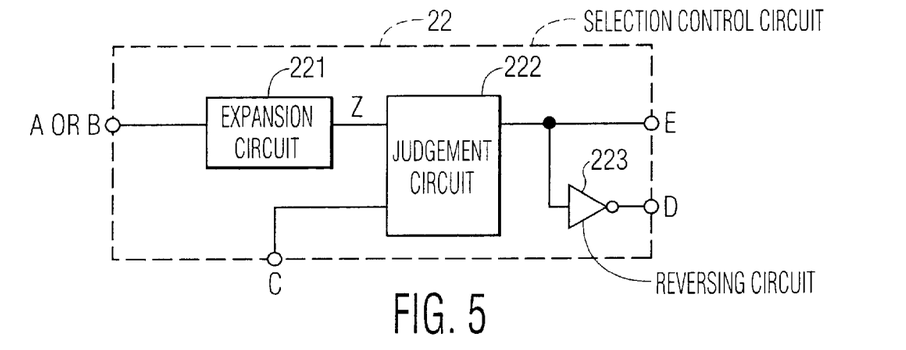
FIG. 5 is a block diagram of a second selection control circuit of a decoder part of a television receiver for receiving multi-standards in accordance with a fifth exemplary embodiment of the present invention.

FIG. 5 is a block diagram of a second selection control circuit of a decoder part of a television receiver for receiving multi-standards in accordance with a fifth exemplary embodiment of the present invention.

Figure 6:
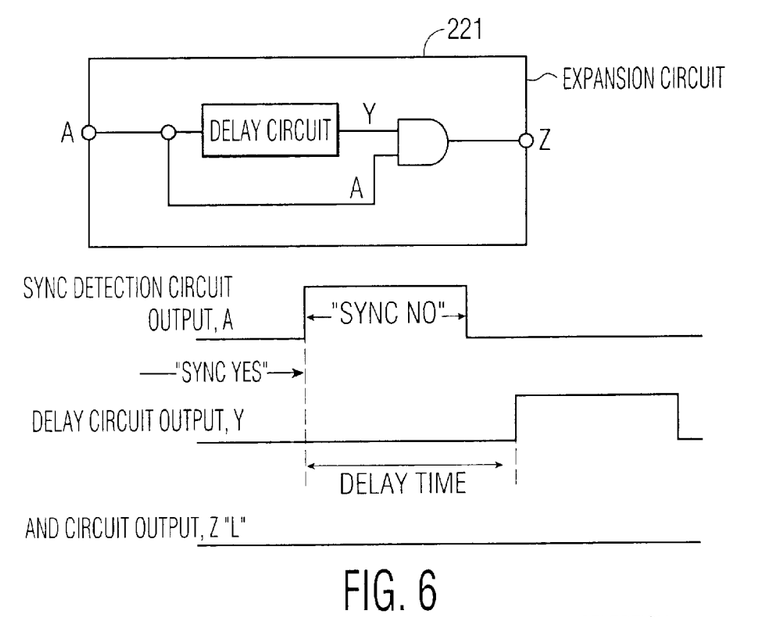
FIG. 6 is a block diagram of an expansion circuit used in the fifth exemplary embodiment of the present invention and a timing chart.

The block 221 is an expansion circuit connected to output terminal A of first sync detection circuit 7 shown in FIG. 4. The block 222 is a judgment circuit connected to output terminal Z of expansion circuit 221 and output terminal C of first selection control circuit 21 shown in FIG. 4. The block 223 is a reversing circuit for reversing a polarity of the output of judgment circuit 222. FIG. 6 is a block diagram of expansion circuit 221 used in the fifth exemplary embodiment of the present invention and a timing chart explaining its function.

The function of the decoder part of a television receiver for receiving multi-standards configured like the above is explained below, referring to FIGS. 4, 5 and 6.

The basic function is similar to that of the fourth exemplary embodiment of the present invention. In the case in which first selection control circuit 21 selects an input terminal having a possibility to include a plurality of broadcast standards in the same channel, judgment circuit 222 functions so as to control tristate buffer 23 and 24 by the output signal from sync detection circuit 7 or 17. On the contrary, in the case in which first selection control circuit 21 selects an input terminal having only one broadcast standard in the same channel, judgment circuit 222 functions so as to control tristate buffer 23 and 24 by the output signal from first selection control circuit 21.

Let's assume the case in which a MUSE signal of BS broadcast is displayed, a transmitting station (location) is switched by a relay and the like and some phase difference occurs in the signals between before and after the switching or the case in which a MUSE signal of BS broadcast is displayed and a sync signal is lost by some accident in an instant. Such a case could occur and can not be neglected for designing receivers.

In the case in which a sync signal is lost for a moment and after that the receiver comes to be able to receive a sync signal again, if the output of first sync detection circuit 7 quickly responds to whether there is a sync signal or not, the receiver is confused. Therefore, when changing from a state with a sync signal to a state without a sync signal, expansion circuit 221 is delayed (about 4 frame periods) until the next sync signal is detected. As a result, the output signal of expansion circuit 221 does not vary. For example, as shown in FIG. 6, after sync detection, if a sync signal is detected, the signal level is made low and if no sync signal is detected, the signal level is made high. If a signal A inputted to expansion circuit 221 and a signal Y delayed by several frame periods are inputted to an AND circuit, a desired signal Z is outputted from the AND circuit.

Although the case of first sync detection circuit 7 of MUSE standard is described in the above explanation, also the case of second sync detection circuit 17 is similar.

Thus, by providing an expansion circuit connected to the output terminal of either sync detection circuit, a judgment circuit for controlling a tristate buffer by the outputs of the expansion circuit and the first selection control circuit and an inversing circuit which is connected to the output terminal of the judgment circuit and controls the other tristate buffer, it is possible to use a memory necessary for a plurality of video signal processing in common and to get a stable performance without selecting a memory against an instant change (missing) of sync signal transmission due to some accident.

(Sixth exemplary embodiment)

Figure 7:
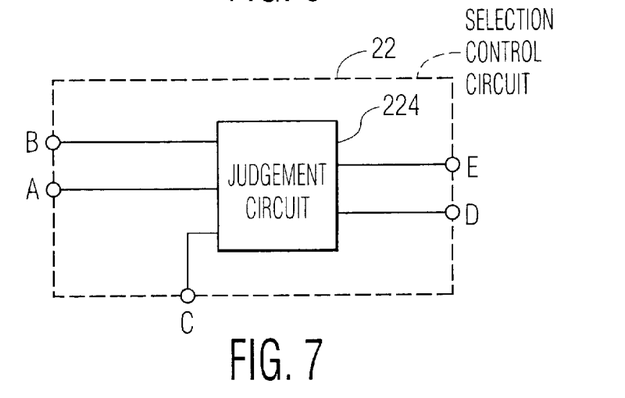
FIG. 7 is a block diagram of a second selection control circuit of a decoder part of a television receiver for receiving multi-standards in accordance with a sixth exemplary embodiment of the present invention.

FIG. 7 is a block diagram of another example of a second selection control circuit of a decoder part of a television receiver for receiving multi-standards in accordance with a sixth exemplary embodiment of the present invention.

The block 224 is a judgment circuit connected to the output terminal A of first sync detection circuit 7, the output terminal B of second sync detection circuit 17 and the output terminal C of first selection control circuit 21.

The function of a decoder part of a television receiver for receiving multi-standards configured like the above is explained below, referring to FIGS. 4 and 7.

The basic function is similar to those of the fourth and fifth exemplary embodiments of the present invention. Let's consider a case in which there are a plurality of signals having different broadcast standards in the same channel. For example, the case in which both input selector circuits 4 and 14 select input terminals 1 and 11 connected to the output terminal of a BS tuner by first selection control circuit 21. In this case, it does not occur that both sync detection circuits 7 and 17 output signals indicating "sync yes" in the same time. Therefore, judgment circuit 224 controls tristate buffer 23 at the output terminal of first video signal processing block 6 on the basis of the output signals of first sync detection circuit 7 and first selection control circuit 21 and controls tristate buffer 24 of second video signal processing block 16 on the basis of the output signals of second sync detection circuit 17 and first selection control circuit 21.

Thus according to the sixth exemplary embodiment of the present invention, by providing a judgment circuit connected to the output terminals of a plurality of sync detection circuits and a first selection control circuit and for independently controlling tristate buffers of a plurality of video signal processing blocks, it is possible to correctly and quickly select a signal to be stored in a common memory block, even if there are a plurality of broadcast standards in the same channel.

(1) According to the first exemplary embodiment of the present invention, by providing a plurality of video signal processing blocks having tristate functions at their output terminals, at least one memory block to which input terminal signal lines from the video signal processing blocks are connected in common, a video signal processing selection circuit for selecting either video signal processing block and independently controlling the output terminals of the video signal processing blocks connected to the memory block in common, there is a period in which the video signal processing blocks are simultaneously in an output state and a memory can be used in common by preventing that a signal from an output terminal of one of the video signal processing blocks flows into an output terminal of the other video signal processing block and breaks a driving element at the output terminal of the latter video signal processing block.

(2) According to the second exemplary embodiment of the present invention, the video signal processing blocks can stop power supplying to the video signal processing blocks which are in an unused state by a control signal from the video signal processing selection circuit and power consumption can be decreased in addition to the effect mentioned in the above (1).

(3) According to the third exemplary embodiment of the present invention, by providing sync separator circuits for each video signal independent of the video signal processing blocks, driving clock signal generators for stopping driving clock signals to the video signal processing blocks (excluding the sync separator circuits) by a control signal from the video signal processing selection circuit and by stopping a driving clock signal to a video signal processing block in an unused state, power consumption can be reduced and by making driving clock signals to the sync separator circuits work, video signal processing blocks can be more quickly selected, in addition to the effect mentioned in the above (1).

(4) According to the fourth exemplary embodiment of the present invention, by providing a plurality of video signal processing blocks and at least one memory block, the input terminal of the memory block and the output terminals of the video signal processing blocks are connected in common, the output terminals of the video signal processing blocks have a tristate function and further by providing a plurality of sync detection circuits, a first selection control circuit for selecting an input video signal and a second selection control circuit connected to the output terminals of the sync detection circuits and the first selection control circuit and for controlling tristate functions of the video signal processing blocks, selection of memory blocks can be correctly controlled even if there are a plurality of signals of different broadcast standards in the same channel. As a result, a memory block can be used in common and a big cost reduction is realized.

(5) According to the fifth exemplary embodiment of the present invention, by providing an expansion circuit connected to an output terminal of either sync detection circuits, a judgment circuit for controlling a tristate function of either video signal processing block by the output signals from the expansion circuit and the first selection control circuit and a reversing circuit connected to the output terminal of the judgment circuit and for controlling a tristate function of the other video signal processing block in the second selection control circuit, even if a sync is misdetected in an instant due to noise and so on, memory is not switched and a stable operation can be obtained as an entire system.

(6) According to the sixth exemplary embodiment of the present invention, by providing a judgment circuit connected to the output terminals of the sync detection circuits and the first selection control circuit and for independently controlling tristate functions of the video signal processing blocks in the second selection control circuit, signals to be stored in a memory can be quickly switched.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A television receiver for receiving multi-standards comprising:

a plurality of video signal processing means having a tristate function at an output terminal of each one of said plurality of video signal processing means;

at least one memory means connected in common to the output terminals of said plurality of video signal processing means having a tristate function;

video signal processing selection means for independently controlling said output terminals of said plurality of video signal processing means so as to select either of said plurality of video signal processing means;

a plurality of sync separator means for each video signal independent of said plurality of video signal processing means; and a plurality of driving clock signal generator means for stopping the driving clock signal of said driving clock signal generator means according to a control signal from said video signal selection control means.

2. A television receiver for receiving multi-standards as recited in claim 1 further comprising:

a plurality of sync detection means for each video signal independent of said plurality of video signal processing means; and said video signal processing selection means comprises:
first selection control means for selecting an input video signal; and
second selection control means connected to output terminals of said plurality of sync detection means and said first selection control means and for controlling tristate functions at output terminals of said plurality of video signal processing means.

3. A television receiver for receiving multi-standards as recited in claim 2, wherein said second selection control means comprises:
expansion means connected to an output terminal of either sync detection means;
judgment means connected to output terminals of said expansion means and said first selection control means and for controlling a tristate function at an output terminal of one of said plurality of video signal processing means; and
reversing means connected to an output terminal of said judgment means and for controlling tristate functions of the other video signal processing means.

4. A television receiver for receiving multi-standards as recited in claim 1, wherein:

said video signal processing selection means comprises:
first selection control means for selecting an input video signal; and
second selection control means coupled to said first selection control means and for controlling tristate functions at the output terminals of said plurality of video signal processing means; wherein
said second selection control means comprises:
judgment means connected to said first selection control means for independently controlling tristate functions at the output terminals of said plurality of video signal processing means.

5. A television receiver for receiving multi-standards as recited in claim 1, further comprising:

a plurality of sync detection means for each video signal independent of said plurality of video signal processing means; and wherein, said video signal processing selection means comprises:
first selection control means for selecting an input video signal; and
second selection control means connected to the output terminals of said plurality of sync detection means and said first selection control means and for controlling tristate functions at the output terminals of said plurality of video signal processing means;

and controls the power supplies of said plurality of video signal processing means.

6. A television receiver for receiving multi-standards as recited in claim 1, further comprising:

a plurality of sync detection means for each video signal independent of said plurality of video signal processing means; and wherein, said video signal processing selection means comprises:
first selection control means for selecting an input video signal; and
second selection control means connected to the output terminals of said plurality of sync detection means and said first selection control means and for controlling tristate functions at the output terminals of said plurality of video signal processing means; wherein said second selection control means comprises:
expansion means connected to an output terminal of one of said plurality of sync detection means;
judgment means connected to output terminals of said expansion means and said first selection control means and for controlling a tristate function at an output terminal of said one of plurality of video signal processing means; and
reversing means connected to the output terminal of said judgment means and for controlling tristate functions at the output terminals of the other video signal processing means; and further said video signal processing selection means controls the power supplies of said plurality of video signal processing means and peripheral circuits.

7. A television receiver for receiving multi-standards as recited in claim 1, further comprising:
a plurality of sync detection means for each video signal independent of said plurality of video signal processing means; and wherein, said video signal processing selection means comprises:
first selection control means for selecting an input video signal; and
second selection control means connected to the output terminals of said plurality of sync detection means and said first selection control means and for controlling tristate functions at the output terminals of said plurality of video signal processing means; wherein said second selection control means comprises:
judgment means connected to the output terminals of said plurality of sync detection means and said first selection control means and for independently controlling tristate functions at the output terminals of said plurality of video signal processing means; and
said video signal processing selection means controls the power supplies of said plurality of video signal processing means.

8. A television receiver for receiving multi-standards as recited in claim 1, further comprising:
a plurality of sync detection means for each video signal independent of said plurality of video signal processing means;
a plurality of sync separator means for each video signal independent of said plurality of video signal processing means; and
a plurality of driving clock signal generator means for stopping the driving clock signal of said driving clock signal generator means according to a control signal from said video signal selection control means; and wherein, said video signal processing selection means comprises:
first selection control means for selecting an input video signal; and
second selection control means connected to the output terminals of said plurality of sync detection means and said first selection control means and for controlling tristate functions at the output terminals of said plurality of video signal processing means.

9. A television receiver for receiving multi-standards as recited in claim 1, further comprising:
a plurality of sync detection means for each video signal independent of said plurality of video signal processing means;
a plurality of sync separator means for each video signal independent of said plurality of video signal processing means; and
a plurality of driving clock signal generator means for stopping The driving clock signal of said driving clock signal generator means according to a control signal from said video signal selection control means; and wherein, said video signal processing selection means comprises:
first selection control means for selecting an input video signal; and
second selection control means connected to the output terminals of said plurality of sync detection means and said first selection control means and for controlling tristate functions at the output terminals of said plurality of video signal processing means; wherein, said second selection control means comprises:
expansion means connected to an output terminal of either sync detection means;
judgment means connected to output terminals of said expansion means and said first selection control means and for controlling tristate functions at the output terminal of one of said plurality of video signal processing means; and
reversing means connected to an output terminal of said judgment means and for controlling tristate functions of the other video signal processing means.

10. A television receiver for receiving multi-standards as recited in claim 1, further comprising:
a plurality of sync detection means for each video signal independent of said plurality of video signal processing means;
a plurality of sync separator means for each video signal independent of said plurality of video signal processing means; and
a plurality of driving clock signal generator means for stopping the driving clock signal of said driving clock signal generator means according to a control signal from said video signal selection control means; and wherein, said video signal processing selection means comprises:
first selection control means for selecting an input video signal; and
second selection control means connected to the output terminals of said plurality of sync detection means and said first selection control means and for controlling tristate functions at the output terminals of said plurality of video signal processing means; wherein, said second selection control circuit is connected to the output terminals of said plurality of sync detection means and said first selection control means and comprises judgment means for independently controlling the tristate means at the output terminals of said plurality of video signal processing means.

* * * * *